March 19, 1968

R. H. MATHES ET AL 3,374,313

CATHODE RAY TUBE OVERLAY INCLUDING A ROTATABLE DISC WITH A
PLURALITY OF RANGE SCALES

Original Filed April 12, 1962

INVENTORS
ROBERT H. MATHES
LAURO C. RICALZONE

BY

ATTORNEY

United States Patent Office 3,374,313
Patented Mar. 19, 1968

3,374,313
CATHODE RAY TUBE OVERLAY INCLUDING A ROTATABLE DISC WITH A PLURALITY OF RANGE SCALES
Robert H. Mathes, Hillcrest Heights, and Lauro C. Ricalzone, Forest Heights, Md., assignors to the United States of America as represented by the Secretary of the Navy
Original application Apr. 12, 1962, Ser. No. 188,006. Divided and this application Mar. 30, 1964, Ser. No. 357,015
2 Claims. (Cl. 178—7.83)

ABSTRACT OF THE DISCLOSURE

This invention is directed to an overlay for a cathode ray tube. The overlay includes a transparent rotatable disc which has a plurality of radially extending range scales which cooperate with the sweep on the scope to determine range of a target displayed by the scope.

The invention described herein may be manufactured and used by or for the Government of the United States of America for governmental purposes without the payment of any royalties thereon or therefor.

This application is a division of application Ser. No. 188,006, filed Apr. 12, 1962 for Antisubmarine Attack Method and Apparatus.

The present invention is directed to apparatus for locating, classifying, and destroying underwater objects. More specifically the invention relates to appartaus employing sonar for antisubmarine warfare.

In order to detect submerged submarines successfully it has been necessary to use long range pulse echo sonar. The capability of modern submarines has been so improved that surface ships can no longer rely on speed and maneuverability for protection. Sub-chasers must, therefore, be able to detect their prey and attack from greater distances. To achieve this, sonars have been developed which have long range capabilities. Since contacts made with this equipment tend to be less positive, the more informative and reliable pulse mode is preferred.

The pulse echo equipment used in sonar work has several drawbacks, however, which tend to limit its use in antisubmarine warfare. One of these is inaccuracy due to lack of resolution. Another is confusion due to the multiplicity of sound paths encountered. Still another is sluggishness due to the low speed of sound in water as compared to radar and optical locating systems. There is also a degree of uncertainty due to the fact that sound will be reflected from any hard surface or even bubble formations present in the propagating medium.

An object of the invention is to provide a combination of long range sonar equipment and related equipment with various types of transporting vehicles to provide an effective anti-submarine attack unit.

Figure 1:
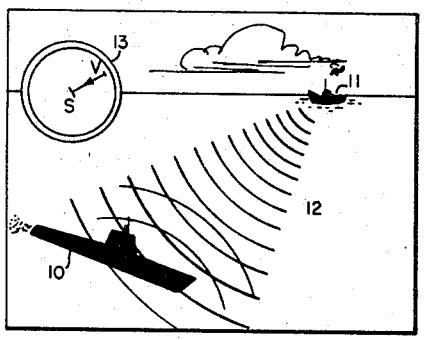
Figure 1:
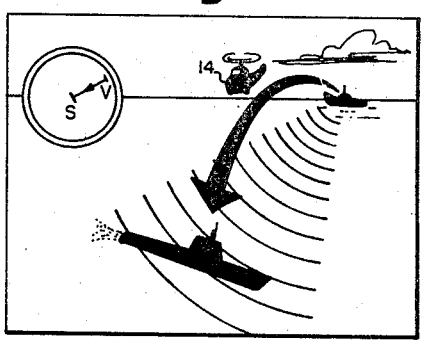
Figure 1:
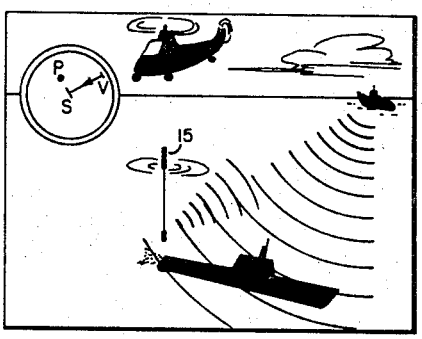
Figure 1:
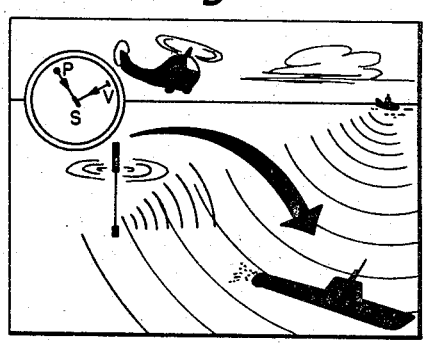
Figure 1:
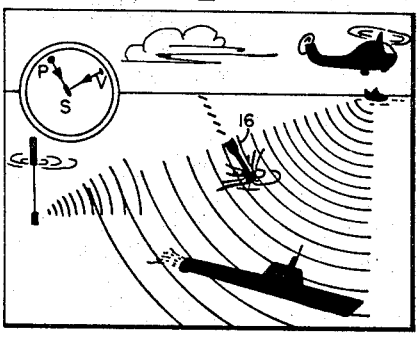
Figure 1:
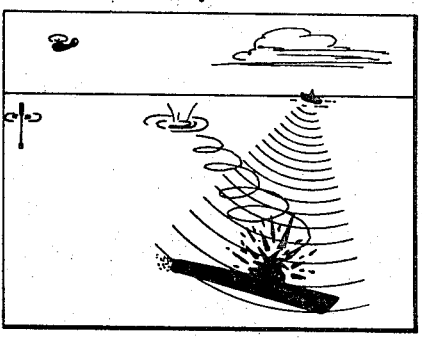
Figure 2:
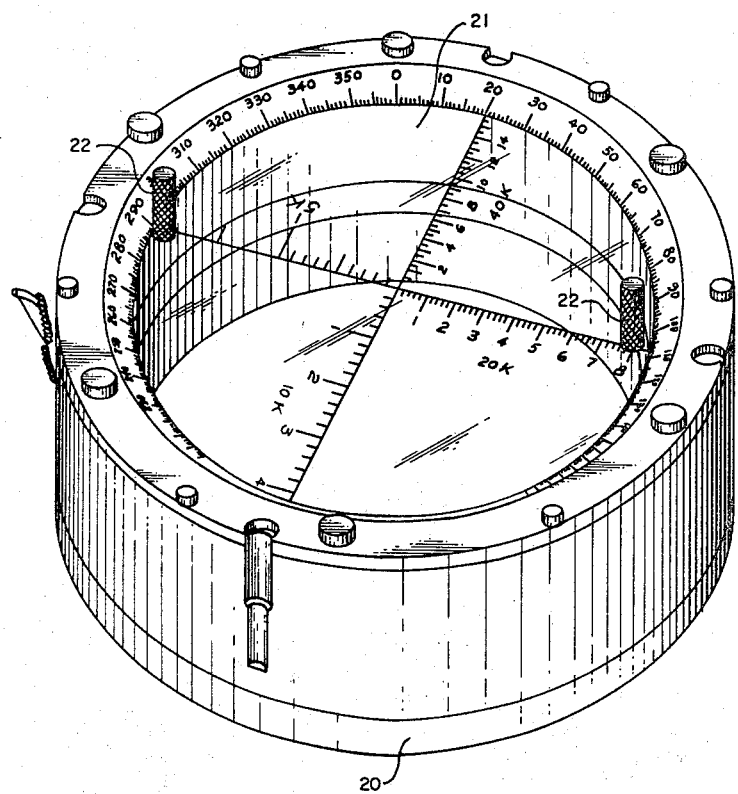

Other objects and attendant advantages of the present invention will be best understood with reference to the following specification taken with the accompanying drawings wherein:

FIGS. 1(a) through 1(f) show the elements of the attack unit and the method in which they operate during an attack; and FIG. 2 shows a rotatable overlay used in combination with the cathode ray tube shown in FIG. 1.

Referring to FIG. 1(a) one example of a suitable combination of basic elements for an attack system are shown. In the foreground a submarine 10 under attack is indicated and this will generally be submerged. In the background is an attacking vessel 11, which in some cases may have a top speed less than that of the submarine. A sonar beam is shown emanating from the long range pulse echo sonar equipment aboard the vessel 11. In the upper left-hand corner, the face of a cathode ray tube 13 which is used to display the information obtained by the sonar equipment is added to show the relative positions of the blips produced by the vessel V and the submarine S.

FIG. 1(b) shows the same elements a short time later and also a high speed vehicle, in this case a helicopter 14, which has been dispatched to the range and bearing of the submarine as obtained by sonar. The helicopter may be launched from the vessel 11 or from a nearby land base. The most convenient method of navigation is employed to guide the helicopter and may involve any system from radar to dead reckoning.

FIG. 1(c) shows the elements a bit later when the helicopter arrives at approximately the range and bearing indicated the sonar equipment. When all of the information available indicates such a point has been reached a sonar transponder is ejected from the helicopter and its position in the water marked by a buoy, dye marker or other suitable means. For this purpose a device called a posit buoy has been developed.

The posit buoy consists of two parts, one heavier and the other lighter than an equal volume of water. Upon impact with the water the heavier part sinks below the water surface where it is supported by a line fastened between it and the lighter buoyant part. The lighter part is painted to contrast with the water and carries lights or radio transponders so that its position may be quickly ascertained and relayed to the helicopter. The heavier part contains a sonar transponder and appears on the sonar display, as indicated by point P on the cathode ray tube, in response to the first subsequent sound pulse from that equipment. Theoretically points P and S should coincide.

There are various reasons why the points P and S do not usually coincide. There will be more or less error in the course of the helicopter depending on the type of navigation used. Also, the sonar beam at long ranges is affected greatly by thermal gradients in the propagating medium. The beam is generally sufficiently refracted that it reflects from at least one interface at the surface or the bottom of the water medium. The subsequent delay and angular deviations affect both the range and bearing.

Fortunately, however, it can be assumed that echoes received from the submarine and the transponder are similarly distorted. The discontinuities found in the water medium do not change abruptly, but extend over broad areas. Since the transponder and submarine are closely spaced compared to distance from each to the vessel 11, it can be safely assumed that both signals travel down the same narrow sound channel through the same discontinuities.

FIG. 1(d) shows the relative position of the lements in the attack unit at a later time, as a result of the information received from the transponder. Since the transponder and submarine echo signals suffer substantially the same distortions in transit, the difference between the two can only be due to a real displacement as indicated by the vector PS. The range and bearing of this vector is transmitted to the helicopter over a radio link, which permits the helicopter to fly directly to the sub.

FIGS. 1(e) and 1(f) show the last steps of the operation. As the helicopter passes over the submarine it drops an appropriate weapon 16 (shown in 1(e) in this case an acoustic homing torpedo. The weapon searches as shown in FIG. 1(f) until it finds and destroys the submarine.

Certain alternative procedures and apparatus may be used in carrying out the above described attack method. The use of display equipment makes it possible to determine visually the information supplied to the helicopter, the information being relayed by radio between the sonar operator and the helicopter pilot. However, since the range and bearing information for both the transponder and the target are available in similar electrical signal form, the two are easily compared in simple logic circuits as found in many electronic data computers. The output of such a computer can directly control an autopilot aboard the helicopter and also direct the release of the weapon at a predetermined time. If the weapon has a greater speed than the helicopter and sufficient range it may be dropped earlier near the transponder after being directed on a bearing to the target.

Additional apparatus that can be used in carrying out the method are lighter-than-air craft, hydrofoil ships and fixed sonar stations. Some work has been done to adapt blimps for sonar work. Hydrofoil craft show considerable promise as both a sonar vessel and a weapon carrier. Since the method does not require movement of the sonar equipment or exact knowledge of its location, an attack may be directed from a shore station connected to an array placed without precision on the ocean floor.

FIG. 2 shows an overlay which may be used with the long range sonar equipment to aid the operator in an attack. The overlay has a metal body portion 20 in the form of a short hollow cylinder. One end of the body portion is closed by a transparent window 21 which rests in a groove therein. The dimensions of the window are sufficiently less than those of the groove to make the former freely rotatable. The end of the body portion outwardly of said transparent window is calibrated circumferentially in bearing angles. The window is calibrated radially with a series of equally spaced parallel range lines radially disposed. One such series is provided for each rate of range sweep provided by the sonar, the range lines being spaced according to the distances represented by each sweep.

To use the overlay, it is centered on the face of the cathode-ray-tube in the sonar set with zero bearing to the North. The window is then rotated so that the appropriate set of range lines is normal to an imaginary line between the blips representing the submarine and the transponder. In this position the range lines radiate toward the bearing of the imaginary line and the range between the two blips is read by counting the number of range lines therebetween.

Such a device is easily constructed by one skilled in the machine shop arts. The body may be made of steel and the window from Lucite. The indicia is preferably engraved but may be painted, if desired. Knobs 22 are fastened to window 21 to facilitate the rotation thereof.

An additional feature of the present method of attack is that it permits the use of short range classification devices. Weapons such as homing torpedoes are very expensive and are often wasted on false targets which long range sonar equipment alone cannot distinguish from real ones. Auxiliary devices; which detect submarines by magnetic anomalies, temperature changes or chemical variations induced in the surrounding media; have been developed. By mounting such a device, for example, a total field magnetometer, on the weapons carrier an additional target characteristic may be checked at close range between the time the posit buoy is dropped and the time the weapon is dropped. High resolution short range sonar is also suitable for this purpose. By long range a distance of many miles, e.g. more than 5 miles, is inferred, while short range classification means generally would be most effective under a mile from target.

If the classification device does not confirm the sonar contact, the weapon is not released. Again most of these devices have been designed to produce an electrical signal, so that they are easily incorporated in an automatic system by those skilled in the art. Performance tests have proved that such classification devices more than justify their extra expense in avoiding the waste of weapons, not to mention the possible consequences of attacking an unknown target.

While the sonar has been described as stationary or mounted on a slow moving vehicle, the method is also employed to advantage with two high speed vehicles. Both vehicles are equipped with long range sonar, anti-submarine weapons and posit buoy or the like. The vehicles are employed as shown in FIGS. 1(a) through 1(f). If an attack is not successful, the vehicles exchange their modes of operation and initiate a new attack.

Obviously many modifications and variations of the present invention are possible in the light of the above teachings. It is therefore to be understood that within the scope of the appended claims the invention may be practiced otherwise than as specifically described.

What is claimed is:
1. An overlay for a cathode ray tube in which said cathode ray tube is operative in a pulse echo sonar system to produce a blip in response to a target contact and to display a plurality of range sweep rates on the face thereof, said overlay comprising:
   mounting means extending upwardly from the display on said cathode ray tube,
   a transparent disc rotatably mounted for free movement in said mounting means in coaxial alignment with the display of said cathode ray tube,
   a plurality of separate radially extending range scales on said transparent disc,
   each of said range scales being calibrated to correspond to a respective one of said range sweep rates of said cathode ray tube, and
   means attached to said disc for freely rotating said disc by hand so that the scale corresponding to the range sweep rate being employed when a blip is produced on said display can be disposed over said blip, whereby the range of the target can be read directly from said scale.

2. The overlay as claimed in claim 1 wherein:
   said mounting means comprises a hollow cylinder with said disc being rotatably mounted in a groove therein, and
   wherein said cylinder is calibrated circumferentially in degrees whereby the bearing of said target is directly readable from said mounting means.

References Cited
UNITED STATES PATENTS

| | | | |
|---|---|---|---|
| 2,446,674 | 8/1948 | Sproul | 178—7.84 |
| 2,468,032 | 4/1949 | Busignies | 343—11 |
| 2,515,221 | 7/1950 | Henning | 178—7.83 |
| 2,540,110 | 2/1951 | Gall | 178—7.83 |
| 2,570,738 | 10/1951 | Wikkenhauser | 178—7.83 |
| 3,127,584 | 3/1964 | Hathaway | 340—3 |

ROBERT L. GRIFFIN, *Primary Examiner.*

LEWIS H. MYERS, JOHN W. CALDWELL, CHESTER L. JUSTUS, *Examiners.*

R. A. FARLEY, J. A. ORSINO, *Assistant Examiners.*